United States Patent
Tatematsu et al.

(10) Patent No.: US 8,242,646 B2
(45) Date of Patent: Aug. 14, 2012

(54) ROTATING ELECTRIC MACHINE AND DRIVE DEVICE

(75) Inventors: Kazutaka Tatematsu, Nagoya (JP); Yasuji Taketsuna, Okazaki (JP); Fumiki Tanahashi, Toyota (JP); Atomi Arakawa, Anjo (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 287 days.

(21) Appl. No.: 12/741,329

(22) PCT Filed: Nov. 6, 2008

(86) PCT No.: PCT/JP2008/070183
§ 371 (c)(1),
(2), (4) Date: May 4, 2010

(87) PCT Pub. No.: WO2009/060887
PCT Pub. Date: May 14, 2009

(65) Prior Publication Data
US 2010/0237725 A1   Sep. 23, 2010

(30) Foreign Application Priority Data
Nov. 9, 2007   (JP) .................................. 2007-292400

(51) Int. Cl.
*H02K 9/08* (2006.01)
(52) U.S. Cl. ............................ 310/61; 310/60 A; 310/52
(58) Field of Classification Search ................. 310/60 A, 310/61, 64, 52, 54, 58, 59
See application file for complete search history.

(56) References Cited

U.S. PATENT DOCUMENTS

| | | | | |
|---|---|---|---|---|
| 2,891,391 | A * | 6/1959 | Grant et al. ..................... | 62/475 |
| 3,663,127 | A * | 5/1972 | Cheers .......................... | 417/372 |
| 3,675,056 | A * | 7/1972 | Lenz .............................. | 310/54 |
| 4,101,793 | A * | 7/1978 | Berthet et al. ................. | 310/52 |
| 6,087,744 | A * | 7/2000 | Glauning ....................... | 310/58 |
| 6,234,767 | B1 | 5/2001 | Takeda et al. | |
| 6,727,609 | B2 * | 4/2004 | Johnsen ......................... | 310/52 |
| 7,786,630 | B2 * | 8/2010 | Waddell et al. ................ | 310/58 |
| 7,834,492 | B2 * | 11/2010 | Iund et al. ...................... | 310/52 |

FOREIGN PATENT DOCUMENTS
DE   4320559 A1 * 12/1994
JP   56-044576 A   4/1981
(Continued)

*Primary Examiner* — Tran Nguyen
*Assistant Examiner* — Naishadh Desai
(74) *Attorney, Agent, or Firm* — Sughrue Mion, PLLC

(57) ABSTRACT

There is provided a rotating electric machine capable of preventing a coolant from being retained at an outer surface of a rotor. This rotating electric machine includes a rotation shaft provided so as to be rotatable, a core body secured to the rotation shaft, a permanent magnet embedded in the core body, and an end plate provided so as to be opposed to an axial end surface of the core body. A first coolant channel is formed in the rotation shaft to allow a coolant to flow therethrough. A second coolant channel is formed between the end plate and the axial end surface of the core body to communicate with the first coolant channel. A partition wall that partitions the second coolant channel in a circumferential direction and a path wall that guides the coolant in the second coolant channel toward an outer peripheral edge region of the axial end surface where the permanent magnet is placed are formed inside the second coolant channel.

4 Claims, 3 Drawing Sheets

FOREIGN PATENT DOCUMENTS

| | | | |
|---|---|---|---|
| JP | 61-141952 A | | 9/1986 |
| JP | 05336706 A | * | 12/1993 |
| JP | 10-120231 A | | 5/1998 |
| JP | 11-113202 A | | 4/1999 |
| JP | 2002-345188 A | | 11/2002 |
| JP | 2005-012891 A | | 1/2005 |
| JP | 2006-025545 A | | 1/2006 |
| JP | 2007-020337 A | | 1/2007 |

* cited by examiner

ROTATING ELECTRIC MACHINE AND DRIVE DEVICE

TECHNICAL FIELD

The present invention relates to a rotating electric machine and a drive device. In particular, the present invention relates to a rotating electric machine having a permanent magnet embedded therein, and a drive device including the rotating electric machine.

BACKGROUND ART

In a rotating electric machine having a permanent magnet embedded therein, a rare-earth magnet is occasionally used as the permanent magnet in order to realize high efficiency and size reduction. In particular, an Nd (neodymium) magnet having a considerably high magnetic characteristic is used occasionally. Such an Nd magnet is excellent in magnetic characteristic, but is poor in temperature characteristic because holding power becomes deteriorated as temperature increases (thermal demagnetization). In the Nd magnet, the deterioration of the holding power causes such a problem that the magnet is demagnetized in an irreversible manner because of an external anti-magnetic field. This problem results in deterioration of performance of the rotating electric machine. Hence, a cooling structure for the permanent magnet to be used in the rotating electric machine becomes important in terms of temperature control in the permanent magnet.

Conventionally, there have been proposed various rotating electric machines such as a motor for cooling a magnet and a coil end of a stator by use of cooling oil or the like (refer to, e.g., Japanese Patent Laying-Open No. 2007-20337 (Patent Document 1), Japanese Patent Laying-Open No. 2002-345188 (Patent Document 2) and Japanese Patent Laying-Open No. 2006-25545 (Patent Document 3)). Japanese Patent Laying-Open No. 2007-20337 (Patent Document 1), Japanese Patent Laying-Open No. 2002-345188 (Patent Document 2) and Japanese Patent Laying-Open No. 2006-25545 (Patent Document 3) each disclose such a structure that a cooling oil channel is formed on a core of a rotation shaft and an end plate and cooling oil is supplied via the cooling oil channel to produce a cooling effect.

Patent Document 1: Japanese Patent Laying-Open No. 2007-20337
Patent Document 2: Japanese Patent Laying-Open No. 2002-345188
Patent Document 3: Japanese Patent Laying-Open No. 2006-25545

DISCLOSURE OF THE INVENTION

Problems to be Solved by the Invention

In a rotor for a rotating electric machine having a permanent magnet embedded therein, typically, an outer surface is larger than an interior with regard to a degree of change in magnetic flux. When an iron core is magnetized (to obtain an electromagnet), electric energy turns into heat and then becomes lost (core loss). In the rotor, consequently, the outer surface becomes higher in temperature.

In the cooling structures proposed in Japanese Patent Laying-Open No. 2007-20337 (Patent Document 1), Japanese Patent Laying-Open No. 2002-345188 (Patent Document 2) and Japanese Patent Laying-Open No. 2006-25545 (Patent Document 3), a coolant flows to an outer surface of a rotor, where a temperature becomes higher, via a coolant channel formed on an end plate. In the coolant channel formed on the end plate, the coolant guided to the coolant channel receives a force so as to be directed to an outer periphery of the end plate because of action of a centrifugal force generated by rotation.

Herein, a coolant flow is formed such that the coolant flows from the coolant channel to a discharge port from which the coolant is discharged. The low-temperature coolant is constantly supplied to the outer surface of the rotor coming into contact with the coolant flow. However, the coolant is occasionally retained at the outer periphery of the end plate because of the slow coolant flow. The outer surface of the rotor, where the coolant is retained, does not come into contact with the coolant flow, so that the coolant which is low in temperature is not supplied thereto. In other words, there arises a problem that the coolant is not supplied throughout the outer surface of the rotor, the temperature increases at the portion where the coolant is retained in the rotor to cause thermal demagnetization, and this thermal demagnetization results in deterioration of the holding power of the magnet.

The present invention has been devised in view of the problems described above, and a principal object thereof is to provide a rotating electric machine capable of preventing a coolant from being retained at an outer surface of a rotor.

Means for Solving the Problems

A rotating electric machine according to the present invention includes a rotation shaft provided so as to be rotatable, a core body secured to the rotation shaft, a permanent magnet embedded in the core body, and an end plate provided so as to be opposed to an axial end surface of the core body. A first coolant channel is formed in the rotation shaft to allow a coolant to flow therethrough. A second coolant channel is formed between the end plate and the axial end surface of the core body to communicate with the first coolant channel. A partition wall that partitions the second coolant channel in a circumferential direction and a path wall that guides the coolant in the second coolant channel toward an outer peripheral edge region of the axial end surface where the permanent magnet is placed are formed inside the second coolant channel.

The path wall extends to reach an outer periphery of the end plate and is formed backward of the partition wall in a rotation direction along the partition wall. A discharge port is formed at the outer periphery of the end plate to discharge the coolant from the second coolant channel. The coolant flows backward in the rotation direction from a radially outward end of the path wall and then flows through the outer periphery of the end plate in the circumferential direction to reach the discharge port.

In the rotating electric machine, preferably, a guide port is formed on the rotation shaft to guide the coolant from the first coolant channel to the second coolant channel. The guide port is formed so as to be located backward of the partition wall in the rotation direction. The discharge port is formed so as to be located backward of a straight line connecting the guide port and a center of rotation, in the rotation direction.

Also preferably the guide port is formed between the partition wall and the path wall.

A drive device according to the present invention includes a first rotating electric machine and a second rotating electric machine. The first rotating electric machine is the above-described rotating electric machine which is rotatable only in one direction. The second rotating electric machine includes a rotation shaft provided so as to be rotatable in two directions, a core body secured to the rotation shaft, a permanent magnet embedded in the core body, and an end plate provided so as to be opposed to an axial end surface of the core body. In the second rotating electric machine, a first coolant channel is formed in the rotation shaft to allow a coolant to flow therethrough. In the second rotating electric machine, a second coolant channel is formed between the end plate and the axial end surface of the core body to communicate with the first coolant channel. In the second rotating electric machine, a partition wall is formed inside the second coolant channel to partition the second coolant channel in a circumferential direction. In the second rotating electric machine, a discharge port is formed at an outer periphery of the end plate along an extension direction of the partition wall to discharge the coolant from the second coolant channel. In the second rotating electric machine, a guide port is formed on the rotation shaft to guide the coolant from the first coolant channel to the second coolant channel. The guide port is formed such that a straight line connecting the guide port and a center of rotation divides an angle formed by the adjacent partition walls into halves.

Effects of the Invention

In the rotating electric machine according to the present invention, the partition wall and the path wall are formed inside the second coolant channel. In the second coolant channel, therefore, the coolant flows toward the outer peripheral edge region of the axial end surface of the core body where the permanent magnet is placed. Thus, it is possible to efficiently cool the permanent magnet in such a manner that the coolant which is low in temperature is constantly supplied to the permanent magnet. Moreover, the coolant flow at the axial end surface of the core body forming the second coolant channel is prescribed in one direction which is opposite to the rotation direction. Therefore, the coolant is prevented from being retained at the axial end surface. As a result, it is possible to constantly supply the coolant throughout the axial end surface in the circumferential direction. Thus, it is possible to suppress the variation of cooling performance of the coolant that cools the permanent magnet (cooling variations). Further, it is possible to prevent thermal demagnetization of the magnet.

DESCRIPTION OF THE REFERENCE SIGNS

Figure 1:
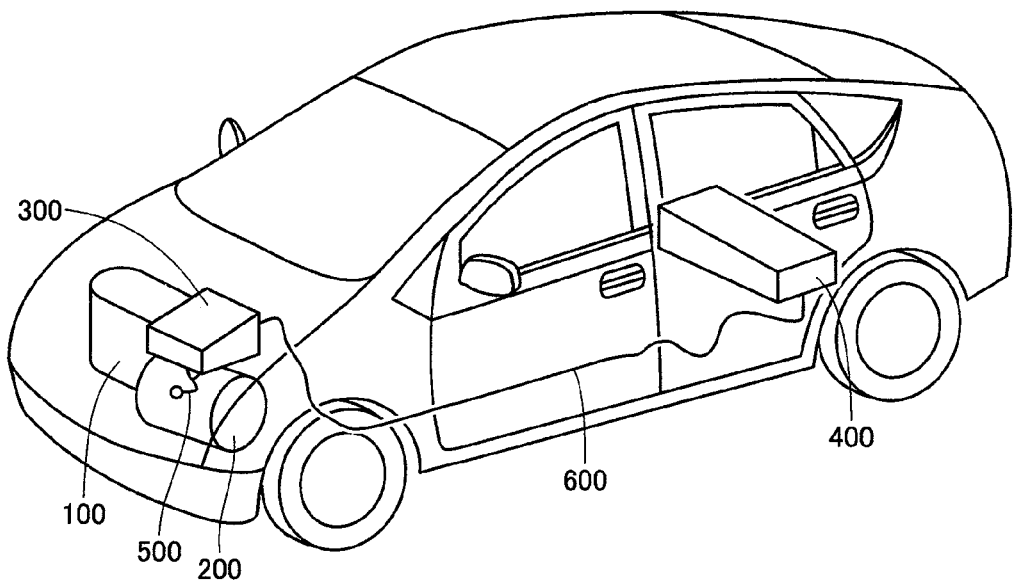
FIG. 1 is a general drawing that shows a configuration of a hybrid vehicle according to Embodiment 1 to which a rotating electric machine is applied.

10: Rotor, 20: Rotor core, 20a: Axial end surface, 21: Electromagnetic steel plate, 29: End plate, 31: Permanent magnet, 41, 42, 43: Coolant channel, 42a: Guide port, 44: Discharge port, 45: Partition wall, 46: Path wall, 47: Outlet, 50: Stator, 51: Coil, 52: Electromagnetic steel plate, 55: Stator core, 58: Shaft, 60: Three-phase cable, 61: U-phase cable, 62: V-phase cable, 63: W-phase cable, 70: Control device, 100: Engine, 100A: Crank shaft, 101: Center line, 200: Drive unit, 210, 211, 212: Rotating electric machine, 211A, 212A: Rotor, 211B, 212B: Stator, 211C, 212C: Stator coil, 220: Power split device, 221, 222: Planetary gear, 221A, 222A: Sun gear, 221B, 222B: Pinion gear, 221C, 222C: Planetary carrier, 221D, 222D: Ring gear, 230: Counter gear, 240: Differential gear, 400: Battery, 500, 600: Cable, RD, RF: Arrow mark

BEST MODES FOR CARRYING OUT THE INVENTION

With reference to the drawings, hereinafter, description will be given of preferred embodiments of the present invention. In the drawings, identical or corresponding parts are shown with an identical reference sign, and description thereof will not be given repeatedly.

Embodiment 1

FIG. 1 is a general drawing that shows a configuration of a hybrid vehicle according to Embodiment 1 to which a rotating electric machine is applied. As shown in FIG. 1, the hybrid vehicle according to this embodiment includes an engine 100, a drive unit 200, a PCU 300 and a battery 400. Drive unit 200 is electrically connected to PCU 300 by way of a cable 500. Moreover, PCU 300 is electrically connected to battery 400 by way of a cable 600.

Engine 100, which is an internal combustion engine, may be a gasoline engine or a diesel engine. Drive unit 200 generates a driving force for driving the vehicle, in cooperation with engine 100. Both engine 100 and drive unit 200 are installed in an engine room of the hybrid vehicle. PCU 300 is a control device that controls operations of drive unit 200. Battery 400 is a chargeable/dischargeable secondary battery. The hybrid vehicle is driven by engine 100 and drive unit 200 to which battery 400 feeds electric power, and each of engine 100 and drive unit 200 serves as a source of mechanical power.

Figure 2:
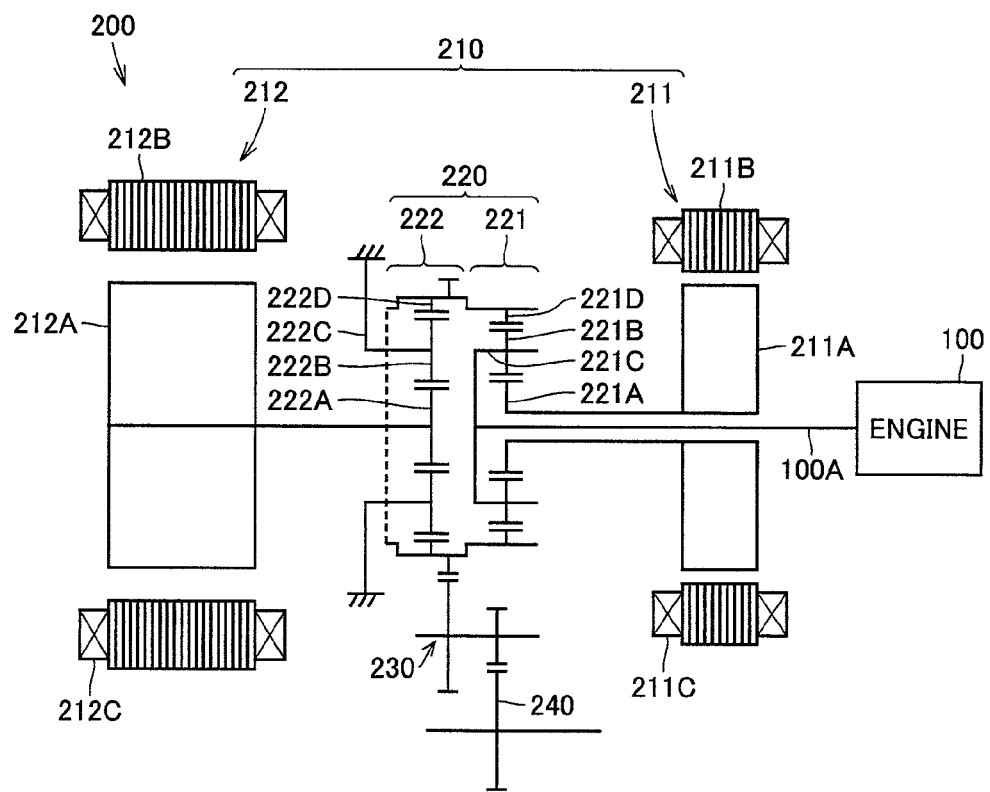
FIG. 2 is a schematic drawing that shows a configuration of a drive unit.

FIG. 2 is a schematic drawing that shows a configuration of the drive unit. As shown in FIG. 2, drive unit 200 includes a rotating electric machine 210, a power split device 220, a counter gear 230 and a differential gear 240.

Rotating electric machine 210 includes rotating electric machines 211 and 212. Power split device 220 is provided between rotating electric machines 211 and 212. Rotating electric machines 211 and 212 have at least one of a function as a motor and a function as a generator. Counter gear 230 is provided between power split device 220 and differential gear 240. Differential gear 240 is connected to a drive shaft. Rotating electric machines 211 and 212, power split device 220, counter gear 230, and differential gear 240 are installed in a casing (not shown).

Rotating electric machine 211 includes a rotor 211A, a stator 211B, and a stator coil 211C wound around stator 211B. Rotating electric machine 212 includes a rotor 212A, a stator 212B, and a stator coil 212C wound around stator 212B.

Power split device 220 includes planetary gears 221 and 222. Planetary gear 221 includes a sun gear 221A, a pinion gear 221B, a planetary carrier 221C and a ring gear 221D. Planetary gear 222 includes a sun gear 222A, a pinion gear 222B, a planetary carrier 222C and a ring gear 222D.

A crank shaft 100A of engine 100, rotor 211A of rotating electric machine 211, and rotor 212A of rotating electric machine 212 rotate about a single axis.

In planetary gear 221, sun gear 221A is coupled to a hollow sun gear shaft having a center of axis through which crank shaft 100A penetrates. Ring gear 221D is supported in a rotatable manner so as to be coaxial with crank shaft 100A. Pinion gear 221B is provided between sun gear 221A and ring gear 221D, and revolves about sun gear 221A while rotating. Planetary carrier 221C is coupled to an end of crank shaft 100A, and supports a rotation shaft of pinion gear 221B.

Rotor 212A of rotating electric machine 212 is coupled to a ring gear case that rotates integrally with ring gear 221D of planetary gear 221, with planetary gear 222 that serves as a speed reducer interposed therebetween.

By virtue of such a structure that planetary carrier 222C, which is one of rotating elements, is fixed to the casing, planetary gear 222 reduces speed. That is, planetary gear 222 includes sun gear 222A that is coupled to a shaft of rotor 212A, ring gear 222D that rotates integrally with ring gear 221D, and pinion gear 222B that meshes with ring gear 222D and sun gear 222A and transmits a torque of sun gear 222A to ring gear 222D.

During running, mechanical power output from engine 100 is transmitted to crank shaft 100A and is distributed into two paths by power split device 220.

One of the two paths is a path for transmitting the mechanical power from counter gear 230 to the drive shaft via differential gear 240. A driving force, which is transmitted to the drive shaft, is transmitted as a torque to a driving wheel, so that the vehicle runs.

The other path is a path for driving rotating electric machine 211 such that rotating electric machine 211 generates electric power. Rotating electric machine 211 generates electric power from mechanical power which is generated by engine 100 and is split by power split device 220. The electric power generated by rotating electric machine 211 is used selectively depending on a running state of the vehicle and a status of battery 400. During normal running or at hard acceleration, for example, the electric power generated by rotating electric machine 211 is used as it is in order to drive rotating electric machine 212. Under conditions prescribed for battery 400, on the other hand, the electric power generated by rotating electric machine 211 is accumulated in battery 400 through an inverter and a converter each provided in PCU 300.

Rotating electric machine 212 is driven by at least one of the electric power accumulated in battery 400 and the electric power generated by rotating electric machine 211. A driving force of rotating electric machine 212 is transmitted from counter gear 230 to the drive shaft via differential gear 240. With this configuration, it is possible to assist a driving force of engine 100 with a driving force from rotating electric machine 212. Further, it is possible to drive the vehicle by use of only the driving force from rotating electric machine 212.

At regenerative braking, on the other hand, the driving wheel is rotated by an inertial force of a vehicle body. Rotating electric machine 212 is driven by a torque from the driving wheel, via differential gear 240 and counter gear 230. Herein, rotating electric machine 212 operates as a generator. As described above, rotating electric machine 212 acts as a regenerative brake that converts braking energy into electric power. The electric power generated by rotating electric machine 212 is accumulated in battery 400 through the inverter provided in PCU 300.

In this embodiment, rotating electric machine 211 has a function as a generator. Moreover, rotating electric machine 212 has a function as a generator and a function as a motor that receives electric power from battery 400 to generate a driving force.

Figure 3:
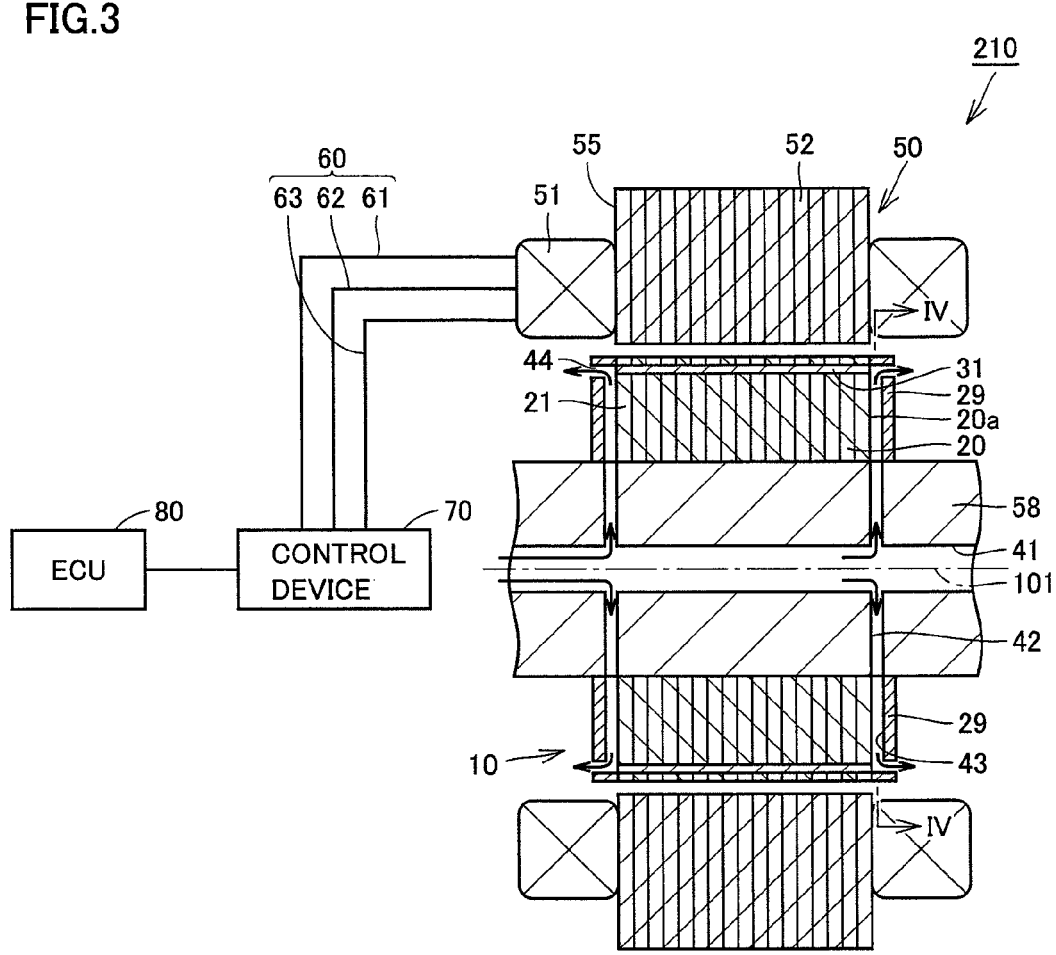
FIG. 3 is a sectional drawing that shows details of the rotating electric machine.

FIG. 3 is a sectional drawing that shows details of the rotating electric machine. With reference to FIG. 3, description will be given of a structure of rotating electric machine 210 as an example. As shown in FIG. 3, rotating electric machine 210 includes a rotor 10, and a stator 50 placed on an outer periphery of rotor 10. Rotor 10 is provided on a shaft 58 that is a rotation shaft extending along a center line 101. Rotor 10 is provided so as to be rotatable together with shaft 58 about center line 101.

Rotor 10 includes a rotor core 20 that is a core body and is secured to shaft 58, and a permanent magnet 31 that is embedded in rotor core 20. That is, rotating electric machine 210 is an IPM (Interior Permanent Magnet) motor. Rotor core 20 is formed along center line 101 and has a cylindrical shape. Rotor core 20 is configured with a plurality of electromagnetic steel plates 21 laminated in an axial direction of center line 101.

An end plate 29 is provided in the direction of center line 101 (the axial direction) of rotor 10 so as to be opposed to an axial end surface 20a of rotor core 20. End plate 29 sandwiches the laminated structure of electromagnetic steel plates 21 in the axial direction. When an end of electromagnetic steel plate 21, which is opposed to permanent magnet 31, is magnetized, a force is acted so as to separate electromagnetic steel plates 21 from each other by action of a magnetic force. However, end plate 29 sandwiches the laminated structure of electromagnetic steel plates 21, and therefore prevents electromagnetic steel plates 21 from being separated from each other. End plate 29 is fixed to shaft 58 by a given method such as screwing, caulking or pressure fitting, and rotates along with rotation of shaft 58.

Stator 50 includes a stator core 55, and a coil 51 wound around stator core 55. Stator core 55 is configured with a plurality of electromagnetic steel plates 52 laminated in the axial direction of center line 101. Herein, rotor core 20 and stator core 55 are not limited to the electromagnetic steel plate, but may be configured with, for example, a dust core.

Coil 51 is electrically connected to a control device 70 by way of a three-phase cable 60. Three-phase cable 60 consists of a U-phase cable 61, a V-phase cable 62 and a W-phase cable 63. Coil 51 consists of a U-phase coil, a V-phase coil and a W-phase coil, and U-phase cable 61, V-phase cable 62 and W-phase cable 63 are connected to terminals of the relevant coils, respectively.

An ECU (Electrical Control Unit) 80 installed in the hybrid vehicle sends, to control device 70, a torque command value to be output from rotating electric machine 210. Control device 70 generates a motor control current for outputting a torque designated based on the torque command value, and feeds the motor control current to coil 51 through three-phase cable 60.

Next, description will be given of a cooling structure of the rotating electric machine according to this embodiment. As shown in FIG. 3, shaft 58 has a hollow shape. A coolant channel 41 is formed inside shaft 58 and extends in the axial direction so as to involve center line 101 which is a center axis of rotation of shaft 58. Moreover, a coolant channel 42 is formed inside shaft 58 and extends in a radial direction of shaft 58. Coolant channel 41 and coolant channel 42 form a first coolant channel. A gap is formed between end plate 29 and axial end surface 20a of rotor core 20 so as to communicate with coolant channel 42. This gap serves as a coolant channel 43. Coolant channel 43 forms a second coolant channel. A discharge port 44 is formed on end plate 29 so as to communicate between coolant channel 43 and the outside.

As shown by arrow marks in FIG. 3, a coolant for cooling permanent magnet 31 can be distributed from coolant channel 41 to coolant channel 43 via coolant channel 42. The coolant supplied to coolant channel 43 can be discharged from coolant channel 43 via discharge port 44.

A contact portion between end plate 29 and rotor core 20 may be formed as a metal touch surface. Moreover, a seal member such as an O ring may be interposed between end plate 29 and rotor core 20. The seal member can prevent the coolant from being leaked from coolant channel 43. Therefore, it is possible to achieve a cooling structure in which a coolant is supplied with higher pressure.

Figure 4:
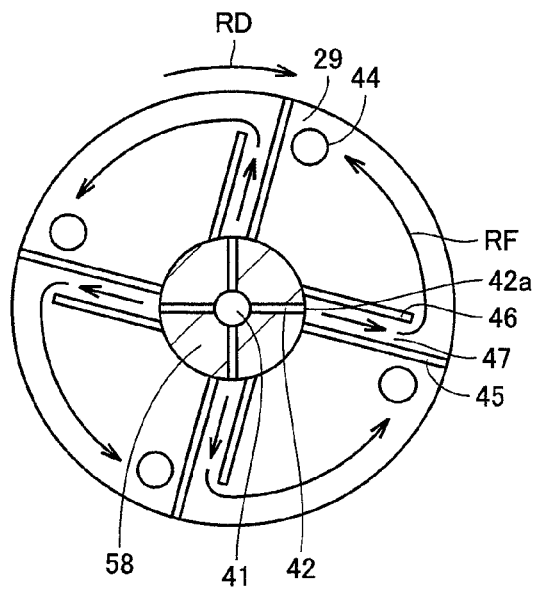
FIG. 4 is a partially sectional schematic drawing that shows a section taken along a line IV-IV shown in FIG. 3.

FIG. 4 is a partially sectional schematic drawing that shows a section taken along a line IV-IV shown in FIG. 3. More specifically, FIG. 4 generally shows end plate 29 which is seen from the side of rotor core 20 through coolant channel 43. As shown in FIG. 4, a partition wall 45 is formed inside coolant channel 43, and partitions coolant channel 43 in a circumferential direction to separate coolant channel 43 into a plurality of spaces. Flat plate-like partition wall 45 is formed along a circular-shaped diameter that forms a contour of end plate 29 shown in FIG. 4 (typically, partition wall 45 is formed in a radial direction of the circle such that an extension of partition wall 45 passes a center of the circle).

Moreover, a path wall 46 is formed inside coolant channel 43. Path wall 46 is formed along partition wall 45 (typically, path wall 46 is formed such that an extension direction of partition wall 45 becomes parallel with an extension direction of path wall 46). In FIG. 4, an arrow mark RD indicates a rotation direction of shaft 58 and end plate 29. In this embodiment, the rotation direction is a clockwise direction as shown by arrow mark RD. Path wall 46 is formed backward of partition wall 45 in the rotation direction (i.e., on a counterclockwise direction side).

Partition wall 45 and path wall 46 are formed integrally with end plate 29 so as to protrude from a surface of end plate 29 opposed to axial end surface 20a of rotor core 20. Herein, partition wall 45 and path wall 46 may be fixed to rotor core 20. More preferably, partition wall 45 and path wall 46 are formed integrally with end plate 29 as shown in FIG. 4 because a parts count of the rotating electric machine can be reduced.

Hereinafter, description will be given of a coolant flow in the cooling structure of the rotating electric machine shown in FIG. 4. First, the coolant, such as cooling oil having an insulating property, which is supplied from coolant channel 41 formed in shaft 58, flows outward in the radial direction in coolant channel 42 by action of a centrifugal force generated by rotation. A guide port 42a is formed on shaft 58, and guides the coolant from coolant channel 42 to coolant channel 43. The coolant is guided from coolant channel 42 to coolant channel 43 via guide port 42a.

The coolant guided to coolant channel 43 flows outward in the radial direction in end plate 29 by the action of the centrifugal force generated by the rotation. As shown in FIG. 4, guide port 42a is formed between partition wall 45 and path wall 46. Therefore, the coolant flows outward in the radial direction in a channel which is the gap formed between partition wall 45 and path wall 46. Since path wall 46 is formed inside coolant channel 43 and extends to reach an outer periphery of end plate 29, the coolant in coolant channel 43 is guided to the outer periphery of end plate 29. More specifically, the coolant in coolant channel 43 is guided by path wall 46 to a radial position, where permanent magnet 31 is placed, in axial end surface 20a of rotor core 20, i.e., an outer peripheral edge region of axial end surface 20a, as shown in FIG. 3. For example, a radial length of path wall 46 can be adjusted such that an outer peripheral end of path wall 46 is located inward of the position, where permanent magnet 31 is placed, in the radial direction.

Further, the coolant receives action of an inertial force (a Coriolis force) generated by rotation of end plate 29. Therefore, the coolant reaches an end of radially outward path wall 46 formed at the outer periphery of end plate 29, and then flows out from the channel between partition wall 45 and path wall 46 via an outlet 47. As shown by arrow mark RF in FIG. 4, thereafter, the coolant flows backward in the rotation direction along the circumferential direction of end plate 29. As shown in FIG. 4, coolant flow RF is prescribed in one direction which is opposite to rotation direction RD. As shown in FIG. 4, discharge port 44 is formed at the outer periphery of end plate 29. Accordingly, the coolant flows through the outer periphery of end plate 29, reaches discharge port 44, and is discharged from coolant channel 43.

The fact that the coolant flows through the outer periphery of end plate 29 corresponds to the fact that the coolant flows through the outer peripheral edge region of axial end surface 20a, where permanent magnet 31 is embedded, in rotor core 20. Accordingly, it is possible to prevent the coolant from being retained at the outer peripheral edge region of axial end surface 20a. Moreover, it is possible to efficiently cool permanent magnet 31 in such a manner that the coolant which is low in temperature is constantly supplied to an end of permanent magnet 31 exposed at axial end surface 20a of rotor core 20.

As described above, an inertial force is acted on the coolant flowing on the surface of end plate 29 which rotates. Thus, guide port 42a for guiding the coolant to coolant channel 43 can be formed so as to be located backward of partition wall 45 in the rotation direction. Moreover, discharge port 44 for discharging the coolant from coolant channel 43 can be formed so as to be located backward of guide port 42a in the rotation direction (such that discharge port 44 is located backward of a straight line connecting guide port 42a and a center of rotation, in the rotation direction, for example). With this configuration, the coolant flows from guide port 42a toward discharge port 44 by the action of the inertial force generated upon rotation of shaft 58 and end plate 29. Therefore, it is possible to more remarkably attain an effect of preventing the retention of the coolant flow.

It is desirable that guide port 42a is formed at a proximate portion located backward of a first partition wall in the rotation direction. It is also desirable that discharge port 44 is formed at a proximate portion located forward of a second partition wall in the rotation direction, the second partition wall being adjacent to the first partition wall and being located backward of the first partition wall in the rotation direction. That is, end plate 29 can be prepared such that, in a portion proximate to one partition wall 45, path wall 46 is formed backward of partition wall 45 in the rotation direction and discharge port 44 is formed forward of partition wall 45 in the rotation direction. As described above, the configuration that guide port 42a and discharge port 44 are formed so as to be closer to partition wall 45 allows elongation of the path of the coolant flowing on the surface of end plate 29. As a result, it is possible to prolong a time during which the coolant comes into contact with permanent magnet 31. Therefore, it is possible to more efficiently cool permanent magnet 31 by use of the coolant flow.

For example, when flat plate-like partition wall 45 is formed in the radial direction of the circle that forms the contour of end plate 29, guide port 42a can be formed such that an angle of 10° or less is formed between a straight line connecting guide port 42a to the center of the circle and the extension direction of partition wall 45. Moreover, discharge port 44 can be formed such that an angle of 10° or less is formed between a straight line connecting discharge port 44 to the center of the circle and the extension direction of partition wall 45.

As described above, in the rotating electric machine according to this embodiment, partition wall 45 and path wall 46 are formed inside coolant channel 43. Herein, partition wall 45 partitions coolant channel 43 in the circumferential direction, and path wall 46 guides the coolant in coolant channel 43 to the outer peripheral edge region of axial end surface 20a of rotor core 20 where permanent magnet 31 is placed. With this configuration, path wall 46 allows the coolant to reliably flow through the position where permanent magnet 31 is placed, and prevents the retention of the coolant. Accordingly, it is possible to efficiently cool permanent magnet 31 in such a manner that the coolant which is low in temperature is constantly supplied to permanent magnet 31.

Moreover, since discharge port 44 is formed backward of guide port 42a in the rotation direction, the coolant flows toward discharge port 44 by the action of the inertial force generated by the rotation. Thus, it is possible to more remarkably attain the effect of preventing the retention of the coolant flow.

Path wall 46 is formed backward of partition wall 45 in the rotation direction along partition wall 45, and guide port 42a is formed between partition wall 45 and path wall 46. Therefore, it is possible to elongate the path of the coolant flowing on the surface of end plate 29. Moreover, it is possible to prolong the time during which the coolant comes into contact with permanent magnet 31. Accordingly, it is possible to more efficiently cool permanent magnet 31 by use of the coolant flow.

Further, since discharge port 44 is formed at the outer periphery of end plate 29, the coolant, which flows toward discharge port 44, reliably flows through the outer periphery of end plate 29 where permanent magnet 31 is placed.

Figure 5:
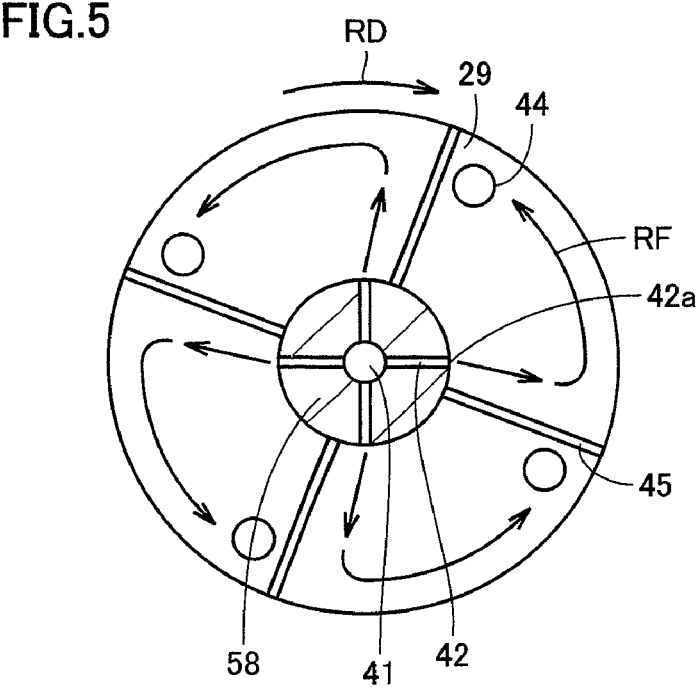
FIG. 5 is a partially sectional schematic drawing that shows a modification example in which no path wall is formed.

The coolant is viscous. Therefore, when shaft 58 as well as rotor core 20 and end plate 29 each secured to shaft 58 rotate in the clockwise direction, the coolant flow can be prescribed in one direction which is opposite to the rotation direction as long as partition wall 45 is formed inside coolant channel 43 even if path wall 46 is not formed. FIG. 5 is a partially sectional schematic drawing that shows a modification example of the sectional drawing shown in FIG. 4, i.e., a modification example in which no path wall is formed.

As shown by arrow mark RF in FIG. 5, the coolant, which is guided from guide port 42a to coolant channel 43, flows toward discharge port 44 by the action of the inertial force (the centrifugal force and the Coriolis force) generated by the rotation. As a result, it is considered that the coolant can be prevented from being retained. In the outer periphery of end plate 29, however, the coolant hardly flows at the proximate portion located backward of partition wall 45 in the rotation direction, because of the action of the Coriolis force. The place where the coolant hardly flows causes a possibility that cooling variations occur at permanent magnet 31. In order to avoid this disadvantage, it is considered that the configuration that path wall 46 is formed is more preferable, as shown in FIG. 4.

Embodiment 2

The rotating electric machine, which is described in Embodiment 1 and has the partition wall and the path wall each formed therein, is preferably used as a rotating electric machine which is rotatable in only one direction, such as a prime motor to be directly coupled to an axle. In some instances, on the other hand, the rotating electric machine according to Embodiment 1 in which the coolant flow is prescribed in one direction is not suitable for a rotating electric machine which is rotatable in two directions such that a frequency of rotation in one direction is equal to a frequency of rotation in the other direction, such as a motor which also serves as a speed reducer. For this reason, the coolant flow is changed in response to the rotation in the two directions. Thus, it is possible to provide a cooling structure suitable for the rotating electric machine which is rotatable in the two directions.

Figure 6:
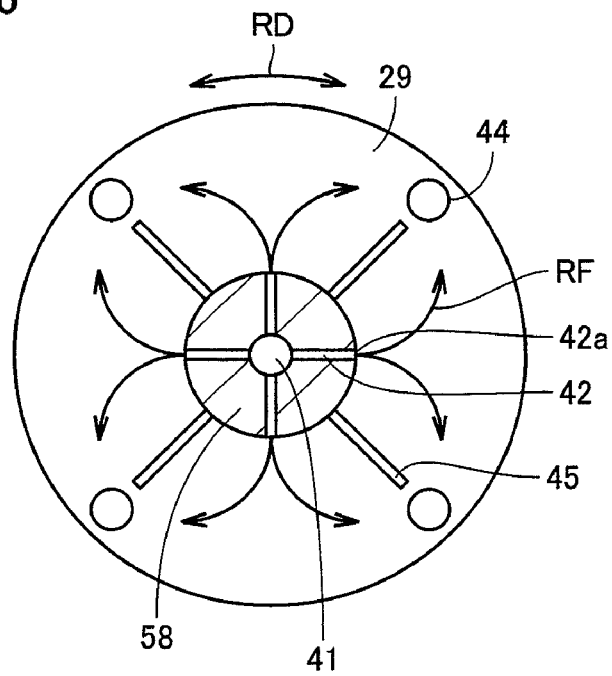
FIG. 6 is a partially sectional schematic drawing that shows a modification example in which a shaft is rotatable in two directions.

FIG. 6 is a partially sectional schematic drawing that shows a modification example of the sectional drawing shown in FIG. 4, i.e., a modification example in which the rotation shaft is rotatable in two directions. As shown in FIG. 6, partition wall 45 is formed on the coolant channel between end plate 29 and the axial end surface of the core body as in Embodiment 1, and partitions the coolant channel in the circumferential direction.

Moreover, discharge port 44 is formed on end plate 29. Discharge port 44 is formed at the outer periphery of end plate 29 along the extension direction of partition wall 45. Further, guide port 42a is formed on shaft 58. Guide port 42a is formed between adjacent two partition walls 45.

With this configuration, when shaft 58 rotates in the clockwise direction, the coolant flows toward the outer periphery of end plate 29 by the action of the inertial force. Herein, the coolant flows in the counterclockwise direction. On the other hand, when shaft 58 rotates in the counterclockwise direction, the coolant flows in the clockwise direction. Then, the coolant is discharged via discharge port 44 formed in the extension direction of partition wall 45 formed backward of guide port 42a in the rotation direction.

As described above, since the coolant flows toward discharge port 44 formed backward of guide port 42a in the rotation direction by the action of the inertial force generated by the rotation, the coolant flow is prevented from being retained. Accordingly, it is possible to efficiently cool permanent magnet 31 in such a manner that the coolant which is low in temperature is constantly supplied to permanent magnet 31.

It is assumed herein that guide port 42a is formed so as to be close to one of adjacent two partition walls 45. Upon rotation in one of two rotatable directions, there arises the following possibility. That is, a surface area of the coolant flowing through the outer periphery of end plate 29 becomes small, cooling variations occur at the permanent magnet, and the permanent magnet is subjected to thermal demagnetization. In order to avoid this disadvantage, it is desirable that guide port 42a is formed at a substantially center of a space surrounded with adjacent two partition walls 45. For example, guide port 42a can be formed such that the straight line connecting guide port 42a and the center of rotation divides an angle formed by adjacent two partition walls 45 into halves.

In drive unit 200 shown in FIG. 2, rotating electric machine 211 having a function as a generator is rotatable only in one direction. Moreover, rotating electric machine 212 having a function as a motor and a function as a generator is rotatable in two directions, and a frequency of rotation in one direction is almost equal to a frequency of rotation in the other direction. Therefore, rotating electric machine 211 is defined as a first rotating electric machine, and the configuration of the rotating electric machine described in Embodiment 1 can be applied to the first rotating electric machine. Moreover, rotating electric machine 212 is defined as a second rotating electric machine, and the configuration of the rotating electric machine described in Embodiment 2 can be applied to the second rotating electric machine. As described above, a rotating electric machine is configured in accordance with a rotation direction characteristic (i.e., a path of a coolant is formed in accordance with a principal rotation direction of a rotating electric machine). Thus, it is possible to obtain a drive device having a cooling structure capable of efficiently cooling a rotating electric machine.

In the foregoing exemplary description, four flat plate-like partition walls are formed on the coolant channel between the end plate and the axial end surface of the core body; however, the present invention is not limited to such a configuration. For example, four or more partition walls may be formed. Alternatively, each of the partition wall and the path wall may be formed in a curved plate shape rather than the flat plate shape. It is desirable that the partition wall is formed so as to divide the coolant channel between the end plate and the axial end surface of the core body in equal parts.

It should be considered that the embodiments disclosed herein are merely illustrative but not limitative in all aspects. The scope of the present invention is defined by the appended claims rather than the foregoing description, and all changes that fall within metes and bounds of the claims or equivalence of such metes and bounds thereof are therefore intended to be embraced by the claims.

INDUSTRIAL APPLICABILITY

In particular, the rotating electric machine according to the present invention is advantageously applicable to a rotating electric machine to be installed in a vehicle.

The invention claimed is:

1. A rotating electric machine comprising:
a rotation shaft provided so as to be rotatable;
a core body secured to said rotation shaft;
a permanent magnet embedded in said core body; and
an end plate provided so as to be opposed to an axial end surface of said core body, wherein
a first coolant channel is formed in said rotation shaft to allow a coolant to flow therethrough,
a second coolant channel is formed between said end plate and said axial end surface of said core body to communicate with said first coolant channel,
a partition wall that partitions said second coolant channel in a circumferential direction and a path wall that guides the coolant in said second coolant channel toward an outer peripheral edge region of said axial end surface where said permanent magnet is placed are formed inside said second coolant channel,
said path wall extends to reach an outer periphery of said end plate and is formed backward of said partition wall in a rotation direction along said partition wall,
a discharge port is formed at the outer periphery of said end plate to discharge the coolant from said second coolant channel, and
the coolant flows backward in the rotation direction from a radially outward end of said path wall and then flows through said outer periphery of said end plate in the circumferential direction to reach said discharge port.

2. The rotating electric machine according to claim 1, wherein
a guide port is formed on said rotation shaft to guide the coolant from said first coolant channel to said second coolant channel,
said guide port is formed so as to be located backward of said partition wall in the rotation direction, and
said discharge port is formed so as to be located backward of a straight line connecting said guide port and a center of rotation, in the rotation direction.

3. The rotating electric machine according to claim 2, wherein
said guide port is formed between said partition wall and said path wall.

4. A drive device comprising a first rotating electric machine and a second rotating electric machine, wherein
said first rotating electric machine is the rotating electric machine according to claim 1, the rotating electric machine being rotatable only in one direction,
said second rotating electric machine includes:
a rotation shaft provided so as to be rotatable in two directions;
a core body secured to said rotation shaft;
a permanent magnet embedded in said core body; and
an end plate provided so as to be opposed to an axial end surface of said core body, and
in said second rotating electric machine,
a first coolant channel is formed in said rotation shaft to allow a coolant to flow therethrough,
a second coolant channel is formed between said end plate and said axial end surface of said core body to communicate with said first coolant channel,
a partition wall is formed inside said second coolant channel to partition said second coolant channel in a circumferential direction,
a discharge port is formed at an outer periphery of said end plate along an extension direction of said partition wall to discharge the coolant from said second coolant channel,
a guide port is formed on said rotation shaft to guide the coolant from said first coolant channel to said second coolant channel, and
said guide port is formed such that a straight line connecting said guide port and a center of rotation divides an angle formed by said adjacent partition walls into halves.

* * * * *